United States Patent
Young et al.

(10) Patent No.: US 9,266,567 B1
(45) Date of Patent: Feb. 23, 2016

(54) VEHICLES HAVING A DASH PANEL REINFORCEMENT GUSSET

(71) Applicant: Toyota Motor Engineering & Manufacturing North America, Inc., Erlanger, KY (US)

(72) Inventors: Jonathan R. Young, Saline, MI (US); Manikandan Baby Mony, Saline, MI (US); Naipaul D. Ramoutar, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/519,702

(22) Filed: Oct. 21, 2014

(51) Int. Cl.
*B60J 7/00* (2006.01)
*B62D 25/14* (2006.01)
*B62D 27/02* (2006.01)

(52) U.S. Cl.
CPC .............. *B62D 25/14* (2013.01); *B62D 27/023* (2013.01)

(58) Field of Classification Search
CPC .... B62D 25/082; B62D 21/152; B60T 7/065; Y10T 74/20528; B60R 21/09; B60R 11/0205; B60R 204/0005; B60R 204/0047; B60K 37/04; B60K 2350/941
USPC ............... 296/187.1, 187.09, 192, 193.09, 296/203.02, 204, 70; 180/274, 90
See application file for complete search history.

(56) References Cited

U.S. PATENT DOCUMENTS

| 4,669,776 | A | * | 6/1987 | Harasaki | B62D 25/025 296/192 |
|---|---|---|---|---|---|
| 5,087,074 | A | | 2/1992 | Komatsu et al. | |
| 5,586,799 | A | * | 12/1996 | Kanemitsu | B62D 25/147 296/187.01 |
| 5,653,495 | A | | 8/1997 | Bovellan et al. | |
| 5,729,463 | A | * | 3/1998 | Koenig | B23K 11/11 700/98 |
| 6,053,564 | A | | 4/2000 | Kamata et al. | |
| 6,322,134 | B1 | * | 11/2001 | Yang | B62D 25/04 296/187.09 |
| 6,364,358 | B1 | * | 4/2002 | Miller | B62D 25/04 280/784 |
| 6,447,052 | B2 | | 9/2002 | Sacki | |
| 6,511,119 | B2 | | 1/2003 | Takase et al. | |
| 6,631,942 | B1 | | 10/2003 | Kitagawa | |

(Continued)

FOREIGN PATENT DOCUMENTS

JP 61-75382 5/1986
JP 2010163039 7/2010

(Continued)

*Primary Examiner* — Kiran B Patel
(74) *Attorney, Agent, or Firm* — Dinsmore & Shohl LLP

(57) ABSTRACT

Vehicle structures for dissipating and distributing energy associated with an impact are described herein. In one embodiment, a vehicle includes a dash panel, a wheel well portion that is positioned proximate to an outboard portion of the dash panel, and a side support coupled to the dash panel. The vehicle also includes a front suspension mount that is coupled to the side support and a rocker support positioned outboard of the side support. The vehicle further includes a wheel that is coupled to the front suspension mount and is positioned at least partially within the wheel well portion and forward of the rocker support, an A-pillar portion that is coupled to the rocker support and to the dash panel, and an inboard gusset that is coupled to the side support and the dash panel at a position proximate to the side support and is spaced apart from the A-pillar portion.

12 Claims, 4 Drawing Sheets

(56) References Cited

U.S. PATENT DOCUMENTS

| | | | |
|---|---|---|---|
| 6,824,204 B2 * | 11/2004 | Gabbianelli | B62D 21/152 296/193.06 |
| 6,866,115 B2 | 3/2005 | Miyasaka | |
| 6,957,846 B2 | 10/2005 | Sacki | |
| 7,219,954 B2 | 5/2007 | Gomi et al. | |
| 7,243,981 B2 | 7/2007 | Park et al. | |
| 7,735,870 B2 | 6/2010 | Kosaka et al. | |
| 7,832,795 B2 * | 11/2010 | Yokoi | B62D 25/2018 296/193.02 |
| 8,029,050 B2 | 10/2011 | Tamakoshi | |
| 8,075,047 B2 | 12/2011 | Yamada et al. | |
| 8,276,980 B2 | 10/2012 | Boettcher et al. | |
| 8,371,643 B2 | 2/2013 | Itakura | |
| 8,382,195 B2 | 2/2013 | Iwase et al. | |
| 8,454,080 B2 | 6/2013 | Qu et al. | |
| 8,469,442 B1 | 6/2013 | Pencak et al. | |
| 8,801,088 B2 * | 8/2014 | Lee | B62D 25/088 296/193.09 |
| 2007/0102222 A1 * | 5/2007 | Tanaka | B60K 13/02 180/291 |
| 2008/0265623 A1 * | 10/2008 | Kiyotake | B62D 21/152 296/187.09 |
| 2009/0195019 A1 * | 8/2009 | Yamada | B62D 25/04 296/187.01 |
| 2009/0243336 A1 * | 10/2009 | Honji | B62D 21/152 296/187.09 |
| 2011/0095568 A1 * | 4/2011 | Terada | B62D 25/088 296/187.09 |
| 2011/0272970 A1 * | 11/2011 | Usuda | B62D 25/14 296/193.09 |
| 2012/0169023 A1 * | 7/2012 | Rawlinson | B60G 15/067 280/124.155 |
| 2012/0205944 A1 * | 8/2012 | Kido | B62D 25/088 296/187.09 |
| 2013/0200650 A1 * | 8/2013 | Matsuoka | B62D 21/155 296/187.1 |
| 2013/0264843 A1 * | 10/2013 | Toba | B62D 21/02 296/204 |
| 2013/0270863 A1 | 10/2013 | Young et al. | |
| 2013/0285414 A1 | 10/2013 | Bhimaraddi et al. | |
| 2013/0320709 A1 | 12/2013 | Kuwabara et al. | |
| 2013/0341969 A1 * | 12/2013 | Fujii | B62D 25/2036 296/193.07 |
| 2014/0125030 A1 | 5/2014 | Hara | |
| 2014/0232136 A1 | 8/2014 | Gilbert et al. | |

FOREIGN PATENT DOCUMENTS

| | | |
|---|---|---|
| JP | 2013252775 | 12/2013 |
| WO | WO2013121890 A1 | 8/2013 |

* cited by examiner

VEHICLES HAVING A DASH PANEL REINFORCEMENT GUSSET

TECHNICAL FIELD

The present specification generally relates to vehicles including structures for transferring and absorbing energy in the event of an impact and, more specifically, to vehicles including one or more reinforcement gussets that are coupled to a dash panel.

BACKGROUND

Vehicles may be equipped with bumper systems and crash protection structures that plastically deform to absorb energy in the event of an impact. When a vehicle impacts or is impacted by an object that is offset from the centerline of the vehicle such that the object overlaps only a portion of the bumper, the capacity of the energy absorbing structures of the vehicle to absorb energy associated with the impact may be reduced. In some impact configurations, the energy absorbing structures of the vehicle may not be activated or may only be partially activated because the object does not come into contact or only partially comes into contact with associated bumper or vehicle structures. Therefore, the bumper and the energy absorbing structures of the vehicle may have a reduced effect on the dissipation of the energy of the impact. Instead, the energy from the impact may be directed into various vehicle structures, including suspension units of the vehicle.

In one example, a substantial portion of energy from an impact with a small front bumper overlap may be directed into a front wheel, which causes the front wheel to be directed in a generally rearward direction. The energy may be transferred rearwardly along the vehicle as the front wheel contacts vehicle structures proximate to a passenger cabin of the vehicle.

Accordingly, a need exists for alternative structures for transferring energy and absorbing energy from a small front bumper overlap impact.

SUMMARY

In one embodiment, a vehicle includes a dash panel that extends in a vehicle lateral direction, a wheel well portion that is positioned proximate to an outboard portion of the dash panel, and a side support that is coupled to the dash panel, where the side support extends in a vehicle longitudinal direction that is transverse to the vehicle lateral direction. The vehicle also includes a front suspension mount that is coupled to the side support and a rocker support that extends in the vehicle longitudinal direction and is coupled to the dash panel, where the rocker support is positioned outboard of the side support in the vehicle lateral direction. The vehicle further includes a wheel that is coupled to the front suspension mount and is positioned at least partially within the wheel well portion and forward of the rocker support in the vehicle longitudinal direction, an A-pillar portion that is coupled to the rocker support and the dash panel, and an inboard gusset that is coupled to the side support and the dash panel at a position proximate to the side support and is spaced apart from the A-pillar portion.

In another embodiment, a vehicle includes a dash panel that extends in a vehicle lateral direction, a wheel well portion that is positioned proximate to an outboard portion of the dash panel, and a side support that is coupled to the dash panel, where the side support extends in a vehicle longitudinal direction that is transverse to the vehicle lateral direction. The vehicle also includes a front suspension mount that is coupled to the side support and a rocker support that extends in the vehicle longitudinal direction and is coupled to the dash panel, where the rocker support is positioned outboard of the side support in the vehicle lateral direction. The vehicle further includes a wheel that is coupled to the front suspension mount and is positioned at least partially within the wheel well portion and forward of the rocker support in the vehicle longitudinal direction, an A-pillar portion that is coupled to the rocker support and the dash panel, an inboard gusset that is coupled to the side support and the dash panel at a position proximate to the side support and is spaced apart from the A-pillar portion, and an outboard gusset that is coupled to the rocker support, the A-pillar portion, and the dash panel and is spaced apart from the side support.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present disclosure may include an inboard gusset coupled to a side support and a cabin-facing side of a dash panel of the vehicle. The inboard gusset may be coupled to the dash panel at a reinforcement portion of the dash panel, which exhibits an increased buckling resistance of the dash panel as compared to a nominal portion of the dash panel positioned distal from the reinforcement portion. The vehicle may further include an outboard gusset that is coupled to a rocker support and/or a pillar portion and the dash panel of the vehicle. The outboard gusset may also be coupled to the dash panel at the reinforcement portion of the dash panel. In the event of an impact that introduces energy to the dash panel, the inboard gusset, the reinforcement portion, and the outboard gusset may absorb energy from the impact and may disperse and distribute energy from the impact among the side support, rocker support, and/or the pillar portion. Absorbing energy and transferring energy among the side support, rocker support, and/or the pillar portion may maintain the structural integrity of the cabin of the vehicle and may prevent intrusion of the dash panel into the cabin of the vehicle. These and other embodiments will be described in more detail below in reference to the appended drawings.

Figure 1:
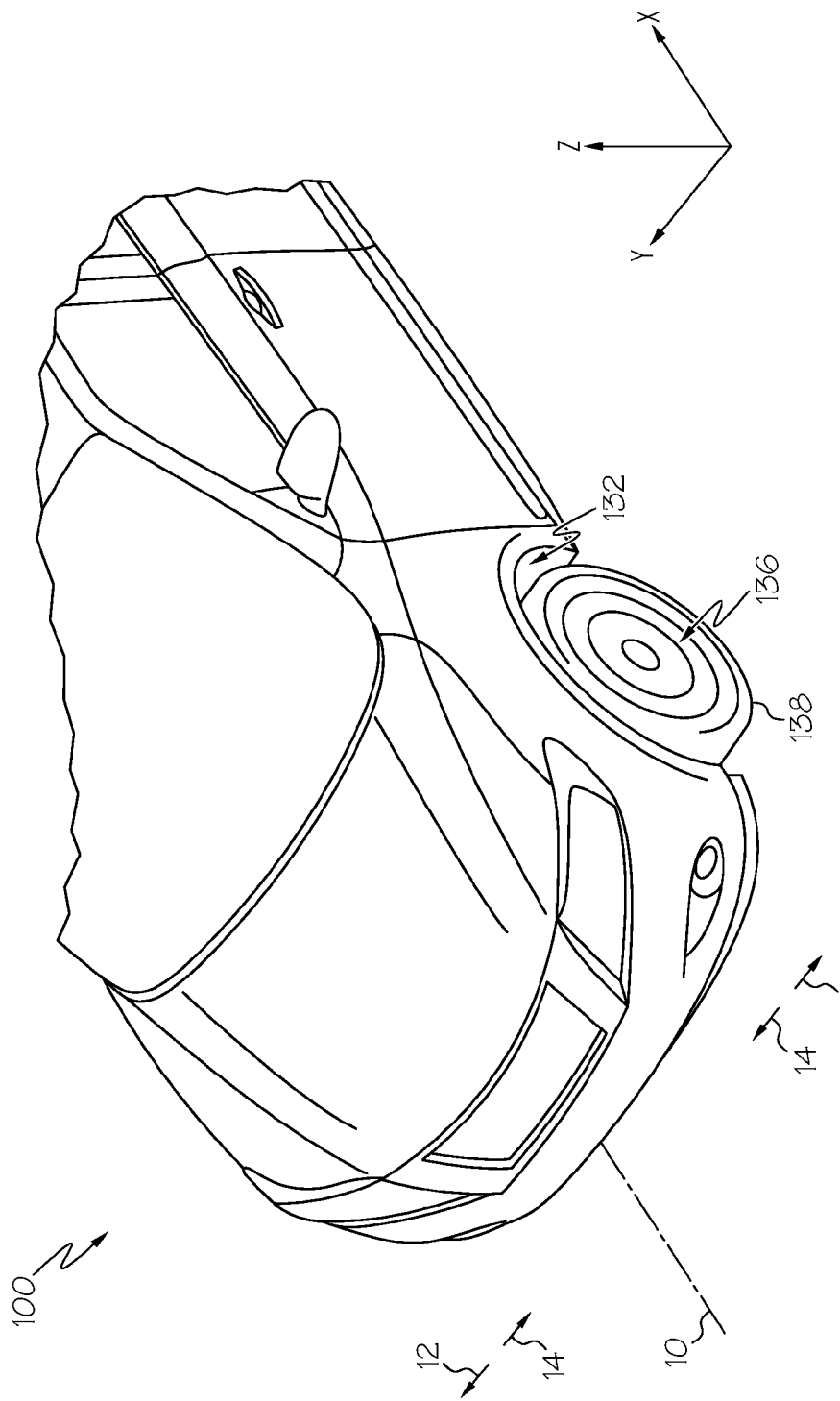
FIG. 1 schematically depicts a perspective view of a vehicle according to one or more embodiments shown or described herein.
Figure 2:
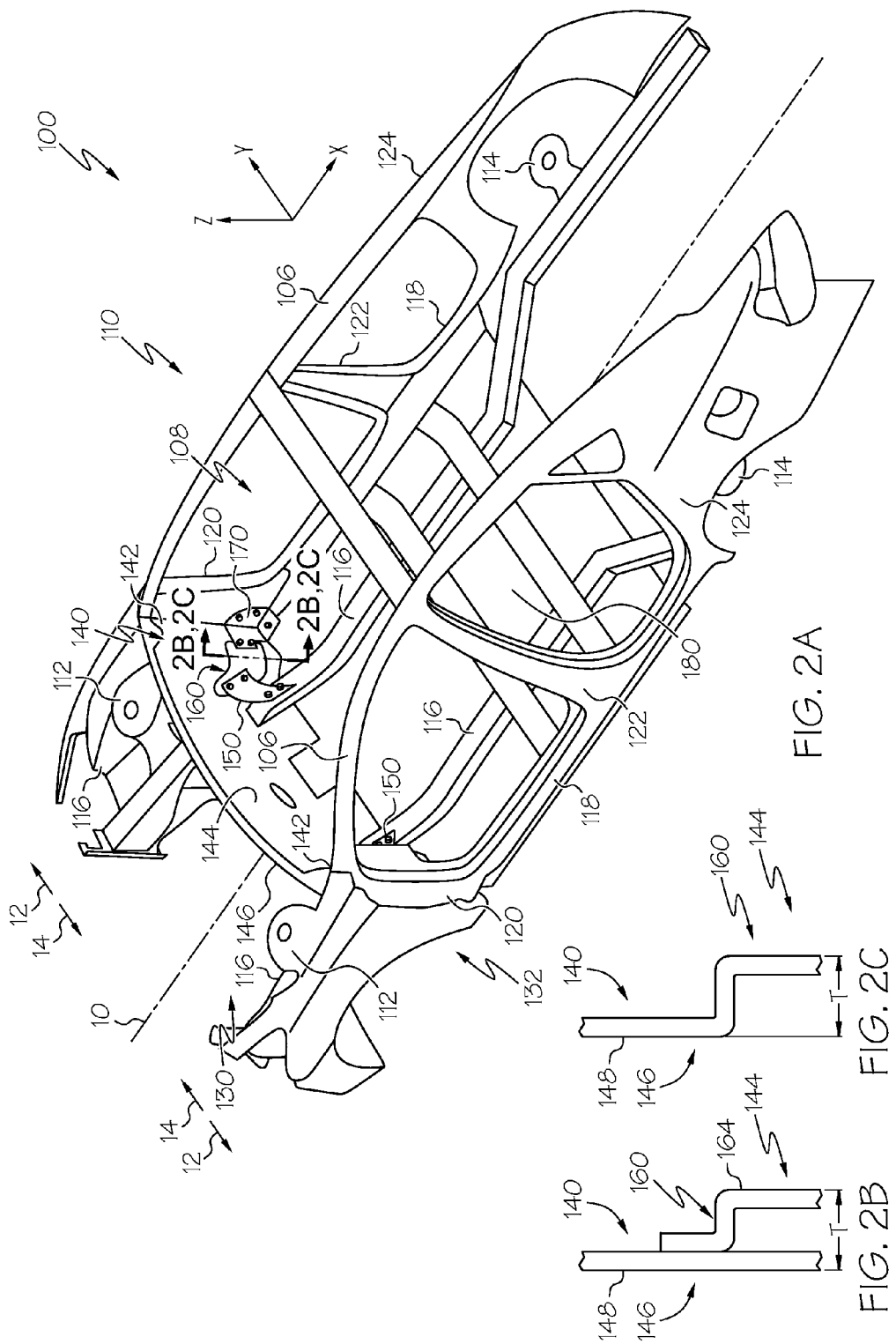
FIG. 2A schematically depicts a perspective view of a vehicle including a dash panel, a reinforcement portion, an inboard gusset, and an outboard gusset according to one or more embodiments shown or described herein.
FIG. 2B schematically depicts an enlarged section view of a reinforcement portion along section 2B-2B depicted in FIG. 2A according to one or more embodiments shown or described herein.
FIG. 2C schematically depicts an enlarged section view of a reinforcement portion along section 2C-2C depicted in FIG. 2A according to one or more embodiments shown or described herein.
Figure 3:
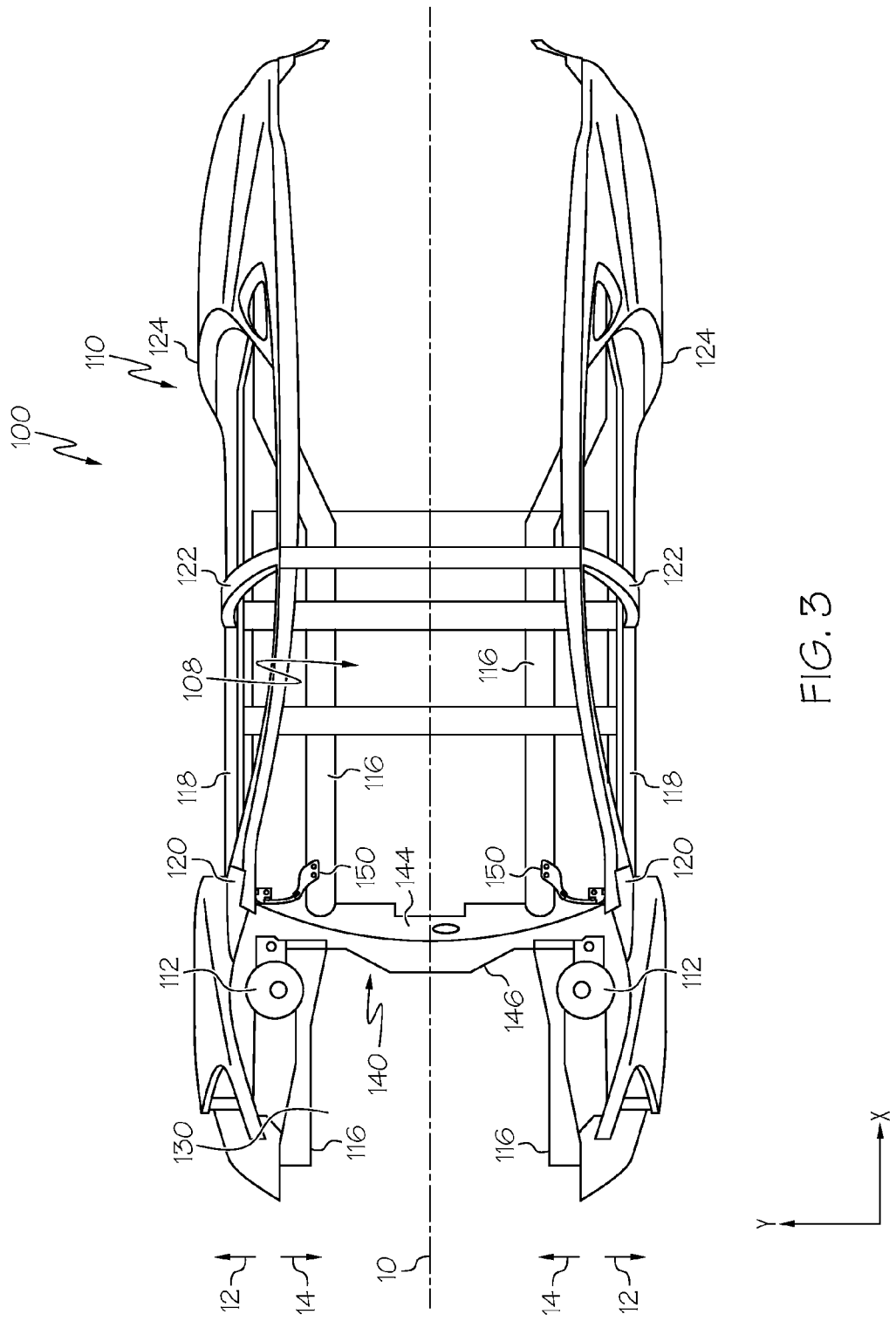
FIG. 3 schematically depicts a top view of a vehicle including a dash panel, a reinforcement portion, an inboard gusset, and an outboard gusset according to one or more embodiments shown or described herein.

Referring initially to FIGS. 1-3, a vehicle 100 is depicted with certain body panels removed for clarity. The vehicle 100 includes a unibody 110 onto which a vehicle drivetrain is coupled. The unibody 110 includes a pair of front suspension mounts 112 and a pair of rear suspension mounts 114 to which the front suspension units 136 and the rear suspension units (not depicted) of the vehicle 100 are generally attached. The vehicle 100 also includes a cabin 108 that is integral with the unibody 110. The cabin 108 generally defines a passenger cabin of the vehicle 100.

Motor vehicles that incorporate elements according to the present disclosure may include a variety of construction methodologies that are conventionally known, including the unibody construction methodology depicted in FIGS. 1-3 as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Referring to FIGS. 2A-4, the unibody 110 includes a pair of side supports 116 that are spaced apart from one another in the vehicle in a vehicle lateral direction (i.e., in the +/−vehicle Y-direction depicted in FIGS. 1-4). The side supports 116 extend in a vehicle longitudinal direction (i.e., in the +/−vehicle X-direction as depicted). The side supports 116 may extend between at least the front suspension mounts 112 and the rear suspension mounts 114 that are positioned rearward of the front suspension mounts 112 in the vehicle longitudinal direction. In some embodiments, the side supports 116 may be formed integrally along their length. In other embodiments, the side supports 116 may be fabricated from a plurality of vehicle structural components that are coupled to one another as to transfer load. In ordinary vehicle operation, the side supports 116 may contribute to overall vehicle stiffness, such that forces introduced to the front suspension units 136 and the rear suspension units (not depicted) of the vehicle 100 can be reacted by the unibody 110. In vehicle embodiments exhibiting unibody construction, the side supports 116 may be integral with the unibody 110, such that the side supports 116 are incorporated into the cabin 108, for example, by the side supports 116 forming a portion of the floor 180 of the cabin 108. In other vehicle embodiments, including, for example, vehicle embodiments exhibiting body-on-frame construction (not depicted), the side supports 116 may be separately attached to the cabin 108.

As used herein, the term "vehicle longitudinal direction" refers to the forward-rearward direction of the vehicle (i.e., in the +/−vehicle X-direction depicted in FIGS. 1-4), which corresponds to the direction between the front suspension mounts 112 and the rear suspension mounts (not depicted). The term "vehicle lateral direction" refers to the cross-vehicle direction of the vehicle (i.e., in the +/−vehicle Y-direction depicted in FIGS. 1-4), and is transverse to the vehicle longitudinal direction. Further, the terms "inboard" and "outboard" are used to describe the relative positioning of various components of the vehicle. Referring to FIGS. 1-4, the term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle structures may be generally symmetrical about the vehicle centerline 10, the direction to which use of terms "inboard" and "outboard" refer may be mirrored about the vehicle centerline 10 when evaluating components positioned along opposite sides of the vehicle 100.

In the depicted embodiments, the front suspension mounts 112 and the rear suspension mounts 114 are coupled to the side supports 116. Referring to FIG. 1, a front suspension unit 136 is coupled to the front suspension mount 112. As used herein, the front suspension units 136 may generally include vehicle components that connect the unibody 110 to a wheel 138. These components may include control arms (not depicted), steering links (not depicted), and a front chassis member (not depicted) including a spring (not depicted) and a strut (not depicted). The spring (not depicted) and the strut (not depicted) may be coupled to a knuckle assembly (not depicted) including a hub (not depicted). A wheel 138 may be coupled to the hub (not depicted).

Referring again to FIGS. 2A-4, the unibody 110 includes a pair of rocker supports 118 that extend in the vehicle longitudinal direction, and are generally parallel to the side supports 116 of the unibody 110. The pair of rocker supports 118 may be positioned outboard from the side supports 116 of the unibody 110. The rocker supports 118 may be positioned proximate to lower portion of the door opening of the cabin 108, and rearward of the wheels 138 of the front suspension units 136. The rocker supports 118 may also be positioned proximate to a floor 180 of the cabin 108.

Still referring to FIGS. 2A-4, the unibody 110 includes an A-pillar portion 120. The A-pillar portion 120 may extend generally upward in a vertical direction (i.e., in the +vehicle Z-direction depicted in FIGS. 1-4) from the pair of rocker supports 118 to support a side rail 106. The unibody 110 may further include a B-pillar portion 122 and a C-pillar portion 124.

The A-pillar portion 120, B-pillar portion 122, and the C-pillar portion 124 may be coupled to the rocker supports 118 of the unibody 110.

As used herein, "engine bay" refers to the portion of the vehicle surrounded by the vehicle front quarter panels and forward of the dash panel 140. Referring now to FIGS. 2A and 3, an engine bay 130 is depicted as being positioned between the pair of side supports 116 and forward of the dash panel 140 in the vehicle longitudinal direction. The engine bay 130 is positioned at a generally forward portion of the cabin 108 at a position proximate to the front suspension mounts 112. A vehicle power source (not depicted), for example, an internal combustion engine, an internal combustion/electric hybrid drive source, or an electric drive source, may be positioned within the engine bay 130. Alternatively, the engine bay 130 may remain generally empty or may include storage space (not depicted), for example when the vehicle power source of the vehicle is positioned in a rearward portion of the vehicle.

Referring to FIGS. 2A-4, a dash panel 140 extends across the unibody 110 in the vehicle lateral direction. The dash panel 140 also extends upward in a generally vertical direction (i.e., in the +Z-direction depicted in FIGS. 1-4) from the pair of rocker supports 118. In embodiments, the dash panel 140 may be coupled to the rocker supports 118 and the side supports 116. The dash panel 140 includes a cabin-facing side 144 and an engine bay-facing side 146 positioned opposite the cabin-facing side 144. The dash panel 140 also includes a pair of outboard portions 142 that extend upward in the generally vertical direction. The A-pillar portion 120 may also extend in a generally vertical orientation and along the outboard portions 142 of the dash panel 140 in the vertical direction. The dash panel 140 may be coupled to the A-pillar portion 120. More specifically, the dash panel 140 may be coupled to the A-pillar portion 120 at the outboard portions 142 of the dash panel 140. The dash panel 140 may be coupled to the A-pillar portion 120, the side supports 116, and the rocker supports 118 with a variety of attachments including, for example and without limitation, welded joints, brazed joints, mechanical fasteners, and structural adhesives. Because the dash panel 140 extends across the unibody 110 in the vehicle lateral direction and extends upward from the pair of rocker supports 118, the dash panel 140 separates the engine bay 130 from the cabin 108.

Referring to FIGS. 1-4, a pair of wheel well portions 132 are positioned proximate to the outboard portions 142 of the dash panel 140. The wheel well portions 132 may be positioned forward of the rocker supports 118. The wheel well portions 132 may be positioned outboard of the side supports 116 in the vehicle lateral direction. The wheel well portions 132 may extend in an outboard direction to a position generally proximate to the rocker supports 118 in the vehicle lateral direction. The wheel well portions 132 may be formed integrally with the dash panel 140 or, alternatively, may be coupled to the dash panel 140. The wheels 138 of the front suspension unit 136 are generally positioned at least partially within the wheel well portions 132 and forward of the rocker supports 118 in the vehicle longitudinal direction. Additionally, the front suspension units 136 may extend between the front suspension mounts 112 and the wheel well portions 132 and may be positioned at least partially within the wheel well portions 132. The wheel well portions 132 may be shaped to generally accommodate a wheel 138 of the front suspension unit 136 that is coupled to the front suspension mount 112. The wheel well portions 132 may accommodate portions of the front suspension unit 136 that are coupled to and extend in an outboard direction from the front suspension mount 112 of the unibody 110. The wheel well portions 132 may separate the cabin 108 and the front suspension units 136 that are coupled to the front suspension mounts 112.

Referring now to FIGS. 2A-4, embodiments according to the present disclosure may include a pair of inboard gussets 150. Description of one of the inboard gussets 150 positioned along one side of the vehicle 100 is made herein for clarity; however it should be understood that the description made herein may apply to both of the inboard gussets 150 of the vehicle 100.

The inboard gusset 150 is coupled to the side support 116 and the dash panel 140. In the depicted embodiment, the inboard gusset 150 is coupled to the side support 116 and the inboard gusset 150 is coupled to the cabin-facing side 144 of the dash panel 140.

The inboard gusset 150 includes a side support attachment portion 152 that is positioned at an outboard end 151 of the inboard gusset 150 and a dash panel attachment portion 153. The side support attachment portion 152 is coupled to the side support 116. The dash panel attachment portion 153 is coupled to the cabin-facing side 144 of the dash panel 140. The inboard gusset 150 includes a link portion 154 that extends between the side support attachment portion 152 and the dash panel attachment portion 153. The inboard gusset 150 may be spaced apart from the A-pillar portion 120 such that the inboard gusset does not provide a direct structural connection between the A-pillar portion 120 and the side support 116 and the A-pillar portion 120 and the dash panel 140.

The link portion 154 includes a contoured wall portion 156 and a stiffening portion 158. The contoured wall portion 156 may be positioned proximate to the cabin-facing side 144 of the dash panel 140. The stiffening portion 158 is positioned rearward from the contoured wall portion 156 in the vehicle longitudinal direction and/or inboard from the contoured wall portion 156. In the embodiment depicted in FIGS. 2A-4, the contoured wall portion 156 and the stiffening portion 158 are integral with one another. In other embodiments, the stiffening portion 158 may be coupled to the contoured wall portion 156.

The stiffening portion 158 may include one or more ribs and/or other structural shapes that may tune the strength and/or stiffness of the link portion 154. By incorporating such shapes that increase the strength and/or stiffness of the link portion 154, the stiffening portion 158 may facilitate the transmission of energy from the dash panel 140 to the side support 116 through the inboard gusset 150, as will be described in greater detail herein.

The inboard gusset 150 may be coupled to the side support 116 and the dash panel 140 through a variety of joining techniques for example and without limitation, welded joints, brazed joints, mechanical fasteners, and structural adhesives. In some embodiments, the outboard gusset 170 may be coupled to the surrounding vehicle structures with a threaded fastener and nut. The inboard gusset 150 may be formed from a variety of materials including, for example and without limitation, metals, composites, and the like. The inboard gusset 150 provides structural reinforcement to the connection between the side support 116 and the dash panel 140, thereby increasing the strength and/or stiffness of the connection between the side support 116 and the dash panel 140.

Referring to FIGS. 2A-4, the dash panel 140 may include reinforcement portions 160 that are positioned proximate to the wheel well portions 132. The reinforcement portions 160 may extend in the vehicle lateral direction between the proximate side support 116 and the rocker support 118. Description of one of the reinforcement portions 160 positioned along one side of the vehicle 100 is made herein for clarity; however it should be understood that the description made herein may apply to both of the reinforcement portions 160 of the vehicle 100.

Referring to FIG. 2B, in some embodiments, the reinforcement portion 160 may include a reinforcement member 164 that is coupled to the dash panel 140. In the depicted embodiment, the reinforcement portion 160 includes a reinforcement member 164 coupled to the cabin-facing side 144 of the dash panel 140. The reinforcement member 164 may be coupled to the dash panel 140 through a variety of joining techniques for example and without limitation, welded joints, brazed joints, mechanical fasteners, and structural adhesives. The reinforcement member 164 may be formed from a variety of materials including, for example and without limitation, metals, composites, and the like. In some embodiments, the reinforcement member 164 may include a multilayer member, such as a noise dampening steel assembly. In embodiments that include a reinforcement member 164, the reinforcement portion 160 may have an increased thickness T with respect to a nominal portion 148 of the dash panel 140 that is positioned distally from the reinforcement portion 160. The reinforcement portion 160 may provide structural reinforcement to the wheel well portion 132 and the dash panel 140, thereby increasing the strength and/or stiffness of the wheel well portion 132 and the dash panel 140. Further, because the reinforcement portion 160 includes an increased cross-section portion of the dash panel 140, the reinforcement portion 160 may have an increased section modulus evaluated in the vehicle longitudinal direction as compared to the nominal portion 148 of the dash panel 140.

Referring to FIG. 2C, in some other embodiments, the reinforcement portion 160 may be integrally formed with the dash panel 140. In embodiments in which the reinforcement portion 160 is integrally formed with the dash panel 140, the reinforcement portion 160 may include an increased cross-section portion of the dash panel 140. In such embodiments, the reinforcement portion 160 may have an increased thickness T with respect to a nominal portion 148 of the dash panel 140 that is positioned distal from the reinforcement portion 160. To increase the thickness T, the reinforcement portion 160 may include a variety of cross-sectional shapes, such as a "hat" shaped cross section, as shown in FIG. 2C. Alternatively or in addition to the cross-sectional shape, the reinforcement portion 160 may include an increased material thickness as compared to the nominal portion 148 of the dash panel 140 to increase the thickness T. The increased thickness of the dash panel 140 at the reinforcement portion 160 may increase the strength and/or stiffness of the dash panel 140 at regions corresponding to the reinforcement portion 160 as compared to regions of the dash panel 140 having a nominal cross section. Further, because the reinforcement portion 160 includes an increased cross-section portion of the dash panel 140, the reinforcement portion 160 may have an increased section modulus evaluated in the vehicle longitudinal direction as compared to the nominal portion 148 of the dash panel 140.

The reinforcement portion 160 may exhibit an increased buckling resistance of the dash panel 140 as compared to the nominal portion 148 of the dash panel 140 positioned distal from the reinforcement portion 160. In embodiments in which the reinforcement portion 160 includes a reinforcement member 164, the reinforcement member 164 may increase the buckling resistance of the dash panel 140 proximate to the reinforcement member 164. In embodiments where the reinforcement portion 160 includes an increased cross-section portion of the dash panel 140, the increased thickness of the reinforcement portion 160 may increase the buckling resistance of the dash panel 140 proximate to the increased cross-section portion. Increasing the buckling resistance of the dash panel 140 may increase the load that the dash panel 140 may resist.

Still referring to FIGS. 2A-2C, in embodiments of the vehicle 100 that include a reinforcement portion 160, the inboard gusset 150 may be coupled to the reinforcement portion 160 of the dash panel 140. The inboard gusset 150, therefore, may be coupled to the reinforcement portion 160 of the dash panel 140 along the cabin-facing side 144 of the dash panel 140 and to the side support 116. The inboard gusset 150 may be coupled to the reinforcement portion 160 through variety of joining techniques for example and without limitation, welded joints, brazed joints, mechanical fasteners, and structural adhesives.

Referring to FIGS. 2A-4, embodiments according to the present disclosure may include outboard gussets 170 that are coupled to the dash panel 140. As depicted, the outboard gussets 170 may be coupled to the cabin-facing side 144 of the dash panel 140. Description of one of the outboard gussets 170 is made herein for clarity; however it should be understood that the description made herein may apply to both of the outboard gussets 170 of the vehicle 100.

The outboard gusset 170 may be coupled to the dash panel 140 and a variety of support structures of the unibody 110. In one embodiment, the outboard gusset 170 is coupled to the rocker support 118 and the dash panel 140. In another embodiment, the outboard gusset 170 is coupled to the A-pillar portion 120 and the dash panel 140. In yet another embodiment, the outboard gusset 170 is coupled to the A-pillar portion 120, the rocker support 118, and the dash panel 140.

The outboard gusset 170 may include an A-pillar attachment portion 172, a dash attachment portion 174, and a rocker attachment portion 176. The A-pillar attachment portion 172 may be coupled to the A-pillar portion 120. The dash attachment portion 174 may be coupled to the cabin-facing side 144 of the dash panel 140. The rocker attachment portion 176 may be coupled to the rocker support 118.

In the embodiment depicted in FIGS. 2A-4, the A-pillar attachment portion 172, the dash attachment portion 174, and the rocker attachment portion 176 come together such that their proximal surfaces are transverse to one another. The arrangement of the A-pillar attachment portion 172, the dash attachment portion 174, and the rocker attachment portion 176 may allow the outboard gusset 170 to contact and to be coupled to the A-pillar portion 120, the dash panel 140, and the rocker support 118. Through coupling of the outboard gusset 170 to the A-pillar portion 120, the dash panel 140, and the rocker support 118, the outboard gusset 170 may maintain the relative positioning of the A-pillar portion 120, the dash panel 140, and the rocker support 118 and may minimize any repositioning of these components introduction of energy from an impact.

Figure 4:
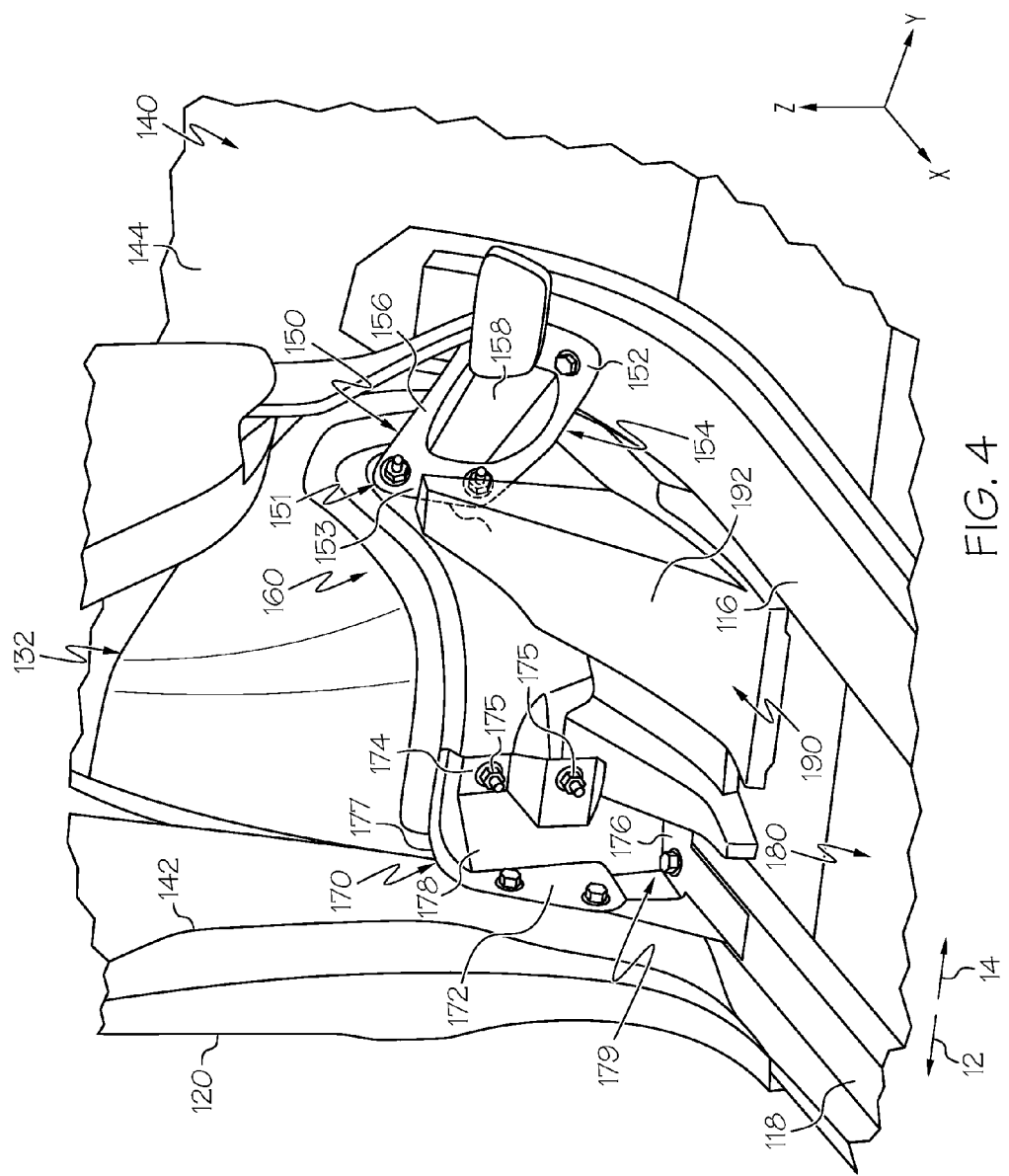
FIG. 4 schematically depicts a dash panel, a reinforcement portion, an inboard gusset, and an outboard gusset according to one or more embodiments shown or described herein.

In some embodiments, the dash attachment portion 174 may have a contoured shape, as illustrated in the embodiment depicted in FIG. 4. The contoured shape of the dash attachment portion 174 may generally correspond to the shape of the dash panel 140, such that the dash attachment portion 174 may be fit in close contact with the dash panel 140. As depicted, the dash attachment portion 174 may have a contoured shape between a plurality of securement positions 175 that couple the outboard gusset 170 to the cabin-facing side 144 of the dash panel 140. In embodiments of vehicles that include a reinforcement portion 160 on the dash panel 140, the dash attachment portion 174 may have a contoured shape that generally corresponds to the reinforcement portion 160 of the dash panel 140, such that the dash attachment portion 174 may be fit in close contact with the reinforcement portion 160 of the dash panel 140.

The outboard gusset 170 may further include a bridge portion 178. The bridge portion 178 may collectively extend between the A-pillar attachment portion 172, the dash attachment portion 174, and the rocker attachment portion 176. The bridge portion 178 may be coupled to the A-pillar attachment portion 172, the dash attachment portion 174, and the rocker attachment portion 176. Alternatively, the bridge portion 178 may be integral with the A-pillar attachment portion 172, the dash attachment portion 174, and the rocker attachment portion 176.

In embodiments, the bridge portion 178, the A-pillar attachment portion 172, and the rocker attachment portion 176 are coupled to one another to form a ridgeline 179 proximate to the A-pillar portion 120, the dash panel 140, and the rocker support 118. In the depicted embodiment, the ridgeline 179 of the outboard gusset 170 is positioned proximate to an intersection between the rocker support 118, the dash panel 140, and/or the A-pillar portion 120, including overlapping the intersection between the rocker support 118 and the A-pillar portion 120. By forming a ridgeline 179, the outboard gusset 170 may minimize the space in the cabin 108 that is occupied by the outboard gusset 170. By minimizing the space occupied by the outboard gusset 170, the ridgeline 179 may maximize the amount of space in the cabin 108 that may be occupied by a driver or passenger's foot.

The outboard gusset 170 may further include a stiffening portion 177. The stiffening portion 177 may be positioned forward and outboard of the bridge portion 178. In embodiments, at least a portion of the stiffening portion 177 may be transverse to the bridge portion 178. The stiffening portion 177 may be coupled to the A-pillar attachment portion, the dash attachment portion 174, and the bridge portion 178.

The stiffening portion 177 may supplement the strength and/or stiffness of the bridge portion 178. By supplementing the strength and/or stiffness of the bridge portion 178, the stiffening portion 177 may facilitate the transmission of energy from the dash panel 140 to the A-pillar portion 120 and the rocker support 118 through the outboard gusset 170, as will be described in greater detail herein.

The outboard gusset 170 may be coupled to the dash panel 140, the rocker support 118, and/or the A-pillar portion 120 through variety of joining techniques for example and without limitation, welded joints, brazed joints, mechanical fasteners, and structural adhesives. In some embodiments, the outboard gusset 170 may be coupled to the surrounding vehicle structures with a threaded fastener and nut. The outboard gusset 170 may be formed from a variety of materials including, for example and without limitation, metals, composites, and the like. The outboard gusset 170 provides structural reinforcement to the vehicle structures to which it is attached, thereby increasing the strength and/or stiffness of the joints that connect the elements of the vehicle structure.

Still referring to FIGS. 2A-4, in embodiments of the vehicle 100 that include a reinforcement portion 160 of the dash panel 140, the outboard gusset 170 may be coupled to the reinforcement portion 160 of the dash panel 140. With the outboard gusset 170 coupled to the reinforcement portion 160, the outboard gusset 170 is coupled to the cabin-facing side 144 of the dash panel 140 at the reinforcement portion 160. The outboard gusset 170 may be coupled to the reinforcement portion 160 and a variety of support structures of the unibody 110. In one embodiment, the outboard gusset 170 may be coupled to the rocker support 118 and the reinforcement portion 160. In another embodiment, the outboard gusset 170 may be coupled to the A-pillar portion 120 and the reinforcement portion 160. In yet another embodiment, the outboard gusset 170 may also be coupled to the A-pillar portion 120, the rocker support 118, and the reinforcement portion 160. The outboard gusset 170 may be coupled to the cabin-facing side 144 of the dash panel 140, the reinforcement portion 160, the A-pillar portion 120, and/or the rocker support 118 through a variety of joining techniques for example and without limitation, welded joints, brazed joints, mechanical fasteners, and structural adhesives.

Referring to FIG. 4, in embodiments, the vehicle 100 may further include a tibia pad 190. The tibia pad 190 may extend rearward from the dash panel 140 and/or the wheel well portion 132 in the vehicle longitudinal direction. The tibia pad 190 may extend between the rocker support 118 and the side support 116 in the vehicle lateral direction. In embodiments, the tibia pad 190 may have a sloped portion 192 that extends downward from the dash panel 140 and/or the wheel well portion 132 to the floor 180. The tibia pad 190 may contact the outboard end 151 of the inboard gusset 150 proximate to the dash panel attachment portion 153. The inboard gusset 150 may be spaced apart from the sloped portion 192 of the tibia pad 190, such that the sloped portion 192 of the tibia pad 190 is not overlapped by the inboard gusset 150. Similarly, the outboard gusset 170 may be spaced apart from the sloped portion 192 of the tibia pad 190, such that the sloped portion 192 of the tibia pad 190 is not overlapped by the inboard gusset 150.

The tibia pad 190 may be formed from various energy absorbing materials, for example and without limitation, structural foam, structural polymers, or other material suitable for absorbing kinetic energy. Because the tibia pad 190 may be formed from energy absorbent materials, the tibia pad may increase a buckling resistance of the dash panel 140. Further, the tibia pad 190 may reduce intrusion of the dash panel 140 and/or the wheel well portion 132 into the cabin 108 during an impact, as will be described in greater detail herein.

The tibia pad 190 may be coupled to the floor 180, the dash panel 140, and/or the wheel well portion 132. In embodiments where the tibia pad 190 is formed from a structural foam, the tibia pad 190 may be coupled to the floor 180, the dash panel 140, and/or the wheel well portion 132 by one or more studs (not depicted) that are coupled to the floor 180, the dash panel 140 and/or the wheel well portion 132. In particular, the tibia pad 190 may be press fit onto the one or more studs (not depicted) of the floor 180, the dash panel 140, and/or the wheel well portion 132. Alternatively, the tibia pad 190 may be coupled to the floor 180, the dash panel 140, and/or the wheel well portion 132 through a variety of joining techniques for example and without limitation, structural adhesives and mechanical fasteners.

When a vehicle impacts a barrier, vehicle structures may elastically and plastically deform to absorb energy while slowing the vehicle from its previous operating speed. The vehicle structures divert and absorb the energy associated with the moving vehicle into energy that deforms the vehicle structures. The vehicle structures may be designed to accommodate the introduction of the energy of the impact, such that the energy associated with the impact may be controllably dissipated and directed through selective and preferential deformation of the vehicle structures.

When a vehicle is involved in a small overlap impact, only a portion of the front bumper may contact a barrier. In such impacts, some of the energy dissipation elements of the vehicle may not be initiated. In such impacts, the energy that is introduced to the vehicle structures may be non-symmetrical when evaluated in the vehicle lateral direction. Accordingly, the reaction of the vehicle structures to the energy introduced by the small overlap impacts may introduce a non-symmetrical response to the vehicle structures. Referring to embodiments disclosed herein, the structural members of the unibody 110 for example, may be non-symmetrically loaded when the vehicle is involved in a small overlap impact.

Referring to FIGS. 1-4, when a vehicle strikes an object with a front corner of the vehicle, the structures of the vehicle plastically and elastically deform to absorb the energy of the impact. The front corner of the vehicle may strike by an object in what is referred to herein as a small front bumper overlap or a small overlap impact. In a small front bumper overlap impact, the impact occurs at an outboard portion of the vehicle (evaluated in a vehicle lateral direction), and only a portion of the front bumper strikes the object. In some small front bumper overlap impacts, only about 25% of the front bumper strikes the object.

Because only a portion of the front bumper strikes an object during a small front bumper overlap impact, all of the energy absorbing structures associated with the front bumper may have a reduced effect on the dissipation of energy of the impact. In particular, some of the energy absorbing structures associated with the front bumper of the vehicle may not be activated or may be only partially activated, such that a portion of the energy absorbing structure of the vehicle may not dissipate energy associated with the small front bumper overlap impact. Instead, the energy from the impact may be directed into the front suspension unit 136 of the vehicle proximate to the barrier that the vehicle impacts.

Referring to FIG. 1, the energy of the small front bumper overlap impact is directed into the portion of the front bumper proximate to the barrier and to the front suspension unit 136 that is proximate to the barrier that the vehicle 100 impacts. The energy that is directed into the front suspension unit 136 may be directed into the wheel 138 through contact between the wheel 138 and the vehicle structure forward of the wheel 138. The energy may elastically and plastically deform the front suspension unit 136. The energy may also direct the wheel 138 in a generally rearward vehicle longitudinal direction (i.e., in the +vehicle X-direction depicted in FIGS. 1-4). The wheel 138 may continue to be directed rearward until the wheel 138 impacts the wheel well portion 132. The wheel 138 may impact the wheel well portion 132, and thereby transferring energy associated with the impact into the wheel well portion 132.

The transferred energy from the wheel 138 may cause the wheel well portion 132 and the dash panel 140 that is proximate to the wheel well portion 132 to deform. The energy introduced to the wheel well portion 132 and the dash panel 140 may be applied in a generally rearward direction. The energy of the impact may tend to deform the wheel well portion 132 rearward and in a direction that tends to deform the wheel well portion 132 and the dash panel 140 into the cabin 108. Additionally, because the wheel well portion 132, the dash panel 140, the side support 116, the rocker support 118, and the A-pillar portion 120 may be coupled to one another, components according to the present disclosure may form forming a strengthened and/or stiffed region of the vehicle structure across which energy is more easily transferred. Transfer of energy along this region may be enhanced, such that energy associated with a small front bumper overlap can be selectively directed away from the passenger compartment.

As discussed hereinabove, embodiments according to the present disclosure introduce additional structural elements to the vehicle 100 that increase the strength and/or stiffness of the surrounding components of the vehicle structure. In some embodiments, the additional structural elements recited herein may supplement the strength and/or stiffness of joints between conventionally known vehicle structures. By increasing the strength and/or stiffness at the targeted positions of the vehicle structure, the load capacity of the vehicle structures may be increased such that the vehicle structures can absorb and/or direct more energy associated with the impact. By increasing the load capacity of the vehicle structures, the energy associated with the impact may be directed away from the passengers in the cabin 108. Further, the energy associated with the impact may be shielded from the targeted regions of the cabin 108.

In the depicted embodiments, the dash panel 140 is coupled to the side support 116 with the inboard gusset 150. As the wheel well portion 132 directs energy into the dash panel 140, the dash panel 140 may tend to deform and/or translate in a generally rearward direction. In particular, the energy introduced to the dash panel 140 from the wheel well portion 132 may tend to deform and/or translate the dash panel 140 in a generally rearward direction. Because the inboard gusset 150 is coupled to the dash panel 140 and the side support 116, the energy that is directed into the dash panel 140 may be reacted by the inboard gusset 150 and the side support 116. Further, energy associated with a small front bumper overlap impact may be diverted from the generally rearward direction, and instead conveyed from the dash panel 140 to the side support 116 through the inboard gusset 150. Thus, energy from the small front bumper overlap impact may be directed away from the cabin 108 of the vehicle 100.

Similarly, in embodiments including an outboard gusset 170 coupled to the dash panel 140 and the A-pillar portion 120 and/or the rocker support 118, energy introduced to the dash panel 140 may be reacted by the dash panel 140, the outboard gusset 170, the A-pillar portion 120, and/or the rocker support 118. Further, energy associated with a small front bumper overlap impact may be diverted from the generally rearward direction, and instead conveyed from the dash panel 140 into the rocker support 118 and/or the A-pillar portion 120 through their respective attachment with the dash panel 140. Thus, energy from the small front bumper overlap impact may be directed away from the cabin 108 of the vehicle 100.

Similarly, as discussed hereinabove, in other embodiments according to the present disclosure, the dash panel 140 may include a reinforcement portion 160. As the wheel well portion 132 and the dash panel 140 deform and/or translate in the generally rearward direction, the energy that is directed into the dash panel 140 may be reacted by the reinforcement portion 160. As described hereinabove, the reinforcement portion 160 may have an increased strength and/or stiffness as compared to the nominal portion 148 of the dash panel 140. The increased strength and/or stiffness of the reinforcement portion 160 may absorb more energy from the impact as compared to the nominal portion 148 of the dash panel 140, thereby absorbing energy that would otherwise be directed into the cabin 108 of the vehicle 100.

Accordingly, by providing an inboard gusset 150 and an outboard gusset 170, energy may be transferred from the wheel well portion 132 and the dash panel 140 to the side support 116, the rocker support 118, and/or the A-pillar portion 120. By transferring energy from the wheel well portion 132 and the dash panel 140 to the side support 116, the rocker support 118, and/or the A-pillar portion 120, the energy that is acting to deform and/or translate the wheel well portion 132 and the dash panel 140 in a generally rearward direction may be dispersed and distributed along the connected vehicle structural members. Further, in embodiments that include both an inboard gusset 150 and an outboard gusset 170, concentrated energy associated with the impact may be more evenly distributed among the connected vehicle structural members as compared to vehicles that utilize a single reinforcement member spanning between the rocker support 118 and side support 116. Incorporation of multiple gussets in such locations may provide targeted energy dissipation between the rocker support 118 and the side support 116. By dispersing and distributing the energy that is acting to deform and/or translate the wheel well portion 132 and the dash panel 140 in the generally rearward direction, intrusion of the wheel well portion 132 and the dash panel 140 into the cabin 108 may be reduced.

As described hereinabove, the reinforcement portion 160 exhibits an increased buckling resistance of the dash panel 140 as compared to the nominal portion 148 of the dash panel 140. Because the reinforcement portion 160 exhibits an increased buckling resistance, the reinforcement portion 160 may absorb more energy that is acting to deform and/or translate the wheel well portion 132 and the dash panel 140 as compared to the nominal portion 148 of the dash panel 140. By absorbing the energy that is acting to deform and/or translate the wheel well portion 132 and the dash panel 140, the reinforcement portion 160 may dissipate the energy at a location forward of the cabin 108 and reduce intrusion of the wheel well portion 132 and the dash panel 140 into the cabin 108. Further, as described hereinabove, by providing an inboard gusset 150 and an outboard gusset 170 that are coupled to the reinforcement portion 160, energy may be transferred from the wheel well portion 132 and the dash panel 140 to the side support 116, the rocker support 118, and/or the A-pillar portion 120. As described above, by transferring energy from the wheel well portion 132 and the dash panel 140 to the side support 116, the rocker support 118, and/or the A-pillar portion 120, the energy that is acting to deform and/or translate the wheel well portion 132 and the dash panel 140 in a generally rearward direction may be dispersed and distributed. By dispersing and distributing the energy that is acting to deform and/or translate the wheel well portion 132 and the dash panel 140 in the generally rearward direction, intrusion of the wheel well portion 132 and the dash panel 140 into the cabin 108 may be reduced.

Further, in embodiments that include the tibia pad 190, the tibia pad 190 may dissipate energy that acts to deform and/or translate the wheel well portion 132 and the dash panel 140, such that the tibia pad 190 maintains separation between the wheel well portion 132 and an occupant.

It should now be understood that vehicles may include a plurality of structures that dissipate and/or direct energy associated with an impact to reduce any intrusion into the passenger cabin of the vehicle. Through the introduction of such structures, including inboard gussets that are coupled to the side support to the dash panel and outboard gussets that couple the rocker support, the A-pillar portion, and the dash panel, the vehicle components that are positioned proximate to the occupants' feet may be stabilized. Stabilization of these connections may increase the strength of the connection, thereby increasing the energy transfer capacity of the connection. By coupling the inboard gussets and the outboard gussets to the surrounding vehicle structures, the energy absorption capacity of the vehicle in the structures proximate to the occupants' feet may be enhanced.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a dash panel extending in a vehicle lateral direction;
a wheel well portion positioned proximate to an outboard portion of the dash panel;
a side support coupled to the dash panel, the side support extending in a vehicle longitudinal direction that is transverse to the vehicle lateral direction;
a front suspension mount coupled to the side support;
a rocker support extending in the vehicle longitudinal direction and coupled to the dash panel, wherein the rocker support is positioned outboard of the side support in the vehicle lateral direction;
a wheel coupled to the front suspension mount and positioned at least partially within the wheel well portion and forward of the rocker support in the vehicle longitudinal direction;
an A-pillar portion coupled to the rocker support and the dash panel; and
an inboard gusset coupled to the side support and the dash panel at a position proximate to the side support and spaced apart from the A-pillar portion.

2. The vehicle of claim 1, wherein the dash panel further comprises a reinforcement portion that exhibits an increased buckling resistance of the dash panel as compared to a nominal portion of the dash panel that is positioned distally from the reinforcement portion and the inboard gusset is coupled to the reinforcement portion of the dash panel.

3. The vehicle of claim 2, further comprising:
an engine bay;
a cabin, wherein the dash panel separates the engine bay from the cabin, and the dash panel comprises a cabin-facing side and an engine bay-facing side,
wherein the reinforcement portion of the dash panel is positioned proximate to the cabin-facing side of the dash panel.

4. The vehicle of claim 3, wherein:
the reinforcement portion of the dash panel comprises an inboard end positioned proximate to the side support and an outboard end positioned proximate to the A-pillar portion;
the inboard gusset comprises an inboard end and an onboard end; and
the outboard end of the inboard gusset is coupled proximate to the inboard end of the reinforcement portion.

5. The vehicle of claim 1, wherein the inboard gusset comprises:
a side support attachment portion;
a dash panel attachment portion; and
a link portion that extends between the side support attachment portion and the dash panel attachment portion, the link portion comprising:
a contoured wall portion positioned proximate to the dash panel; and
a stiffening portion that extends from the contoured wall portion.

6. The vehicle of claim 1, further comprising:
a tibia pad positioned proximate to the dash panel; and
a floor coupled to the dash panel and the rocker support, wherein:
the tibia pad extends rearward from the dash panel and between the rocker support and the side support;
the tibia pad comprises a sloped portion that extends transverse to the dash panel and the floor; and
the inboard gusset is spaced apart from the sloped portion of the tibia pad.

7. The vehicle of claim 2, wherein a thickness of the reinforcement portion of the dash panel is greater than a thickness of the nominal portion of the dash panel.

8. The vehicle of claim 2, wherein the reinforcement portion of the dash panel comprises an increased section modulus of the dash panel evaluated in the vehicle longitudinal direction as compared to the nominal portion of the dash panel.

9. The vehicle of claim 1, further comprising an outboard gusset coupled to the rocker support, the A-pillar portion, and the dash panel and spaced apart from the side support.

10. The vehicle of claim 9, wherein the outboard gusset comprises:
an A-pillar attachment portion coupled to the A-pillar portion;

a dash attachment portion coupled to the dash panel;

a rocker attachment portion coupled to the rocker support; and a bridge portion coupled to the A-pillar attachment portion, the dash attachment portion, and the rocker attachment portion, wherein each of the A-pillar attachment portion, the dash attachment portion, and the rocker attachment portion extend in directions that are transverse to one another.

11. The vehicle of claim 10, wherein the rocker attachment portion, the A-pillar attachment portion, and the bridge portion of the outboard gusset are coupled to one another to form a ridgeline, and the ridgeline of the rocker attachment portion is positioned proximate to an intersection between the rocker support and the A-pillar portion.

12. The vehicle of claim 9, wherein the outboard gusset is coupled to a reinforcement portion that exhibits an increased buckling resistance of the dash panel as compared to a nominal portion of the dash panel that is positioned distally from the reinforcement portion and the inboard gusset is coupled to the reinforcement portion of the dash panel.

\* \* \* \* \*